United States Patent [19]
Suzuki et al.

[11] Patent Number: 4,846,124
[45] Date of Patent: Jul. 11, 1989

[54] ENGINE WITH A BALANCER MECHANISM

[75] Inventors: Hitoshi Suzuki; Tomohiro Hirano; Kenichi Goto; Yoshimi Watanabe, all of Saitama, Japan

[73] Assignee: Honda Giken Kogyo Kabushiki Kaisha, Tokyo, Japan

[21] Appl. No.: 152,000

[22] Filed: Feb. 3, 1988

[30] Foreign Application Priority Data

| Feb. 3, 1987 | [JP] | Japan | 62-23333 |
| Feb. 3, 1987 | [JP] | Japan | 62-23334 |
| Feb. 3, 1987 | [JP] | Japan | 62-23335 |
| Apr. 15, 1987 | [JP] | Japan | 62-92344 |
| Jun. 10, 1987 | [JP] | Japan | 62-144324 |
| Aug. 3, 1987 | [JP] | Japan | 62-194214 |

[51] Int. Cl.$^4$ .................................. F02F 7/00
[52] U.S. Cl. ........................ 123/195 P; 123/192 B; 123/192 R
[58] Field of Search ............ 123/192 B, 192 R, 195 P; 74/603, 604

[56] References Cited

U.S. PATENT DOCUMENTS

| 2,076,892 | 4/1937 | Irgans | 123/195 P |
| 2,460,419 | 2/1949 | Kincannon | 123/195 P |
| 3,431,882 | 3/1969 | Irgans | 123/195 P |
| 4,480,607 | 11/1984 | Isai et al. | 123/192 R |
| 4,538,481 | 9/1985 | Ohta et al. | 123/195 P |
| 4,688,528 | 8/1987 | Nivi et al. | 123/192 B |
| 4,695,261 | 9/1987 | Broughton et al. | 123/195 P |
| 4,734,070 | 3/1988 | Mondek | 123/195 P |

FOREIGN PATENT DOCUMENTS 0158331 1/1983 Japan .................. 123/192 B

Primary Examiner—Raymond A. Nelli
Attorney, Agent, or Firm—Birch, Stewart, Kolasch & Birch

[57] ABSTRACT

An engine has a cylinder block having a vertical array of cylinders, a crankcase joined to one side of the cylinder block, a cylinder head joined to an opposite side of the cylinder block, pistons reciprocally movable in the cylinders, a crankshaft vertically extending through the engine block and rotatably supported in the cylinder block and the crankcase, the crankcase having couterweights, connecting rods interconnecting the pistons and the crankshaft, and a balancer mechanism coacting with the crankshaft. The balancer mechanism is disposed upwardly of the cylinder block and accommodated in a balancer housing projecting from upper surfaces of the cylinder block and the crankcase. The balancer mechanism comprises a driver gear mounted on the crankshaft, first and second balancer shafts extending parallel to the crankshaft, and first and second balancers mounted respectively on the first and second balancer shafts and operatively coupled to the driver gear. The first and second balancers are disposed on diametrically opposite sides of the driver gear and arranged such that a line interconnecting the centers of the first and second balancers is inclined with respect to an axis of the cylinder block.

16 Claims, 9 Drawing Sheets

ENGINE WITH A BALANCER MECHANISM

BACKGROUND OF THE INVENTION

1. Field of the Invention

The present invention relates generally to an engine for use in an outboard motor, and more particularly to a small engine with a balancer mechanism.

2. Description of the Relevant Art

When pistons reciprocally move in an engine, the engine violently vibrates as a whole under inertial forces generated by reciprocating movement of the piston. Usually, a plurality of crank webs or counterweights are mounted on the crankshaft in order to cancel out the inertial forces. Upon rotation of the crankshaft caused by reciprocating movement of the piston, other inertial forces are produced in a direction normal to the direction in which the pistons move.

Japanese Utility Model Publication No. 52-32802 discloses a counterbalance mechanism for suppressing engine vibration arising from the latter inertial forces. The disclosed counterbalance mechanism generally includes two balancer shafts disposed one on each side of the crankshaft parallel thereto and operatively coupled to the crankshaft by gears, chains, or the like, for being rotated in opposite directions at the same speed as that of the crankshaft, and balancers mounted on the balancer shafts. The crank webs counterbalance half of the reciprocating mass including crankshaft-connected members such as linearly movable pistons and connecting rods, and each of the balancers counterbalances one quarter of that reciprocating mass. The balancers and the crank webs are oriented in the same direction at the top and bottom dead centers of the pistons. This counterbalance mechanism is effective in eliminating inertial forces produced in the direction of movement of the pistons and also inertial forces generated in the direction normal to the direction of movement of the pistons by the crank webs and the balancers, and in preventing a couple of forces from being produced. The disclosed counterbalance mechanism can therefore reduce engine vibration effectively.

Since the balancers are disposed on the diametrically opposite sides of the crankshaft, they have to be sufficiently spaced from the crankshaft so as to be held out of physical interference with the crank webs. As a result, the engine is large in size as a whole. Moreover, attachment of engine components and accessories such as a carburetor and an engine starter is highly complex, i.e., not enough space is available for easy installation of these engine components and accessories. The width of the engine may be increased dependent on how these engine components and accessories are located.

SUMMARY OF THE INVENTION

It is an object of the present invention to provide an engine with a balancer mechanism, the engine being small in overall size.

Another object of the present invention is to provide an engine with a balancer mechanism, the engine providing enough space for installing engine components and accessories therein.

Still another object of the present invention is to provide an engine with a balancer mechanism, the engine being capable of supplying lubricating oil to the bearings of balancer shafts without complicating the structure of the engine.

According to a preferred embodiment of the present invention, there is provided an engine comprising an engine block having at least one cylinder therein, a piston reciprocally movable in the cylinder, a crankshaft vertically extending through and rotatably supported in the engine block, the crankshaft having a counterweight, a connecting rod operatively interconnecting the piston and the crankshaft, and a balancer mechanism coacting with the crankshaft and disposed upwardly of the engine block.

The engine block comprises a cylinder block and a crankcase joined to an open side of the cylinder block, further including a balancer housing projecting from upper surfaces of the cylinder block and the crankcase, the balancer mechanism being disposed in the balancer housing, the balancer housing has an upper opening closed by a cover. With this arrangement, it is not neccessary to provide any special housing for accommodating the balancer mechanism. An engine starter mechanism is disposed upwardly of the balancer mechanism, the engine starter mechanism being supported on the cover, thus reducing the number of parts used.

The balancer mechanism comprises a driver gear mounted on the crankshaft, first and second balancer shafts having upper ends rotatably supported in the cover and lower ends rotatably supported in the balancer housing, and extending parallel to the crankshaft, and first and second balancers mounted respectively on the first and second balancer shafts and operatively coupled to the driver gear. The first and second balancers are disposed on diametrically opposite sides of the driver gear and arranged such that a line interconnecting the centers of the first and second balancers is inclined with respect to a line interconnecting the axis of the crankshaft and a point where the connecting rod is coupled to the piston. This arrangement prevents the engine from being increased in its width. Engine component such as a carburetor may be disposed in spaces defined by the engine block and the balance housing.

The above and further objects, details and advantages of the present invention will become apparent from the following detailed description of preferred embodiments thereof, when read in conjunction with the accompanying drawings.

DETAILED DESCRIPTION OF THE PREFERRED EMBODIMENT

Figure 1:
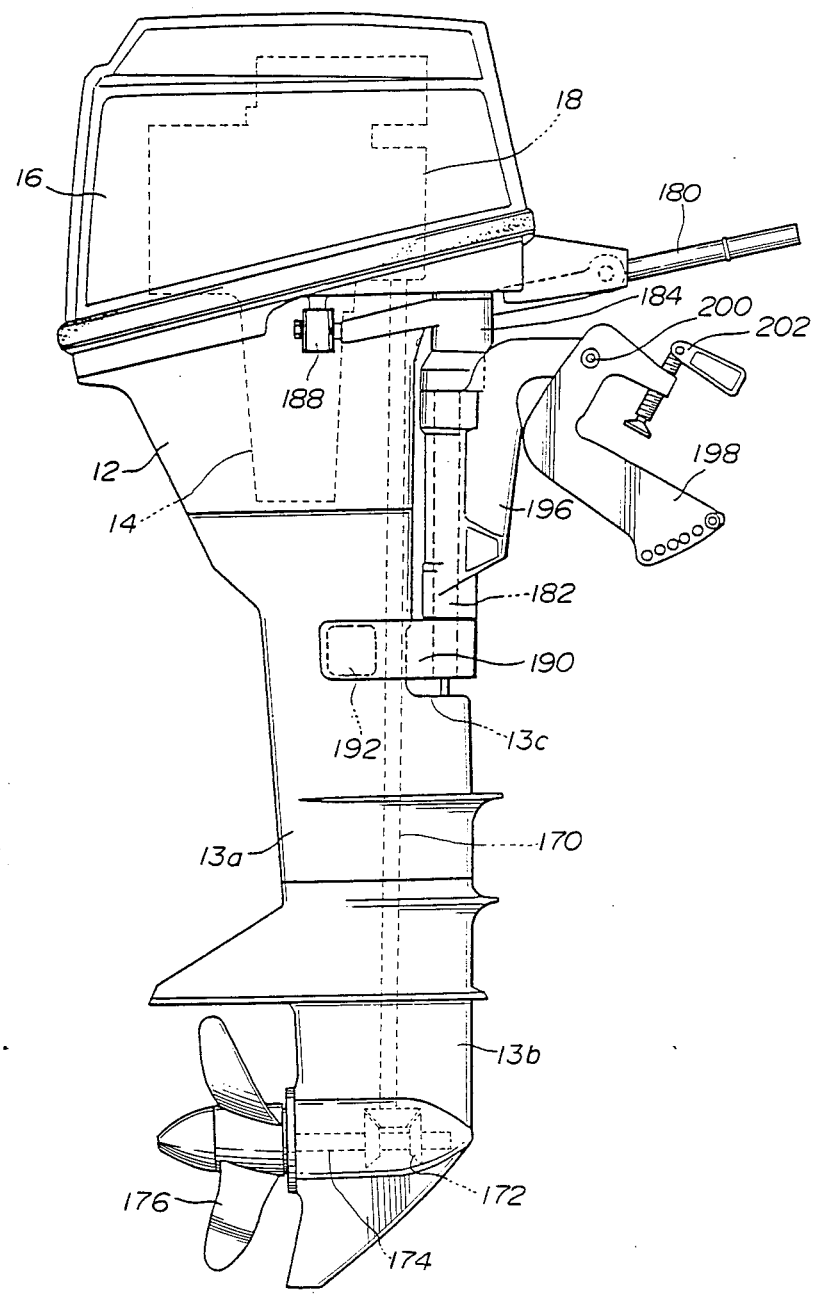
FIG. 1 is a side elevational view of an outboard motor including an engine with a balancer mechanism according to the present invention.

As shown in FIG. 1, an outboard motor or marine propulsion device, generally indicated by the reference numeral 10, generally includes an oil casing 12 having an integral oil pan 14, and an engine or power housing 16 joined to the oil casing 12. The engine housing 16 accommodates therein an engine 18 schematically indicated by the broken lines. While the engine is illustrated as an outboard motor engine by way of example, the present invention is not limited to engines for marine use, but is also applicable to various engines, as can easily be understood by those skilled in the art.

Figure 2:
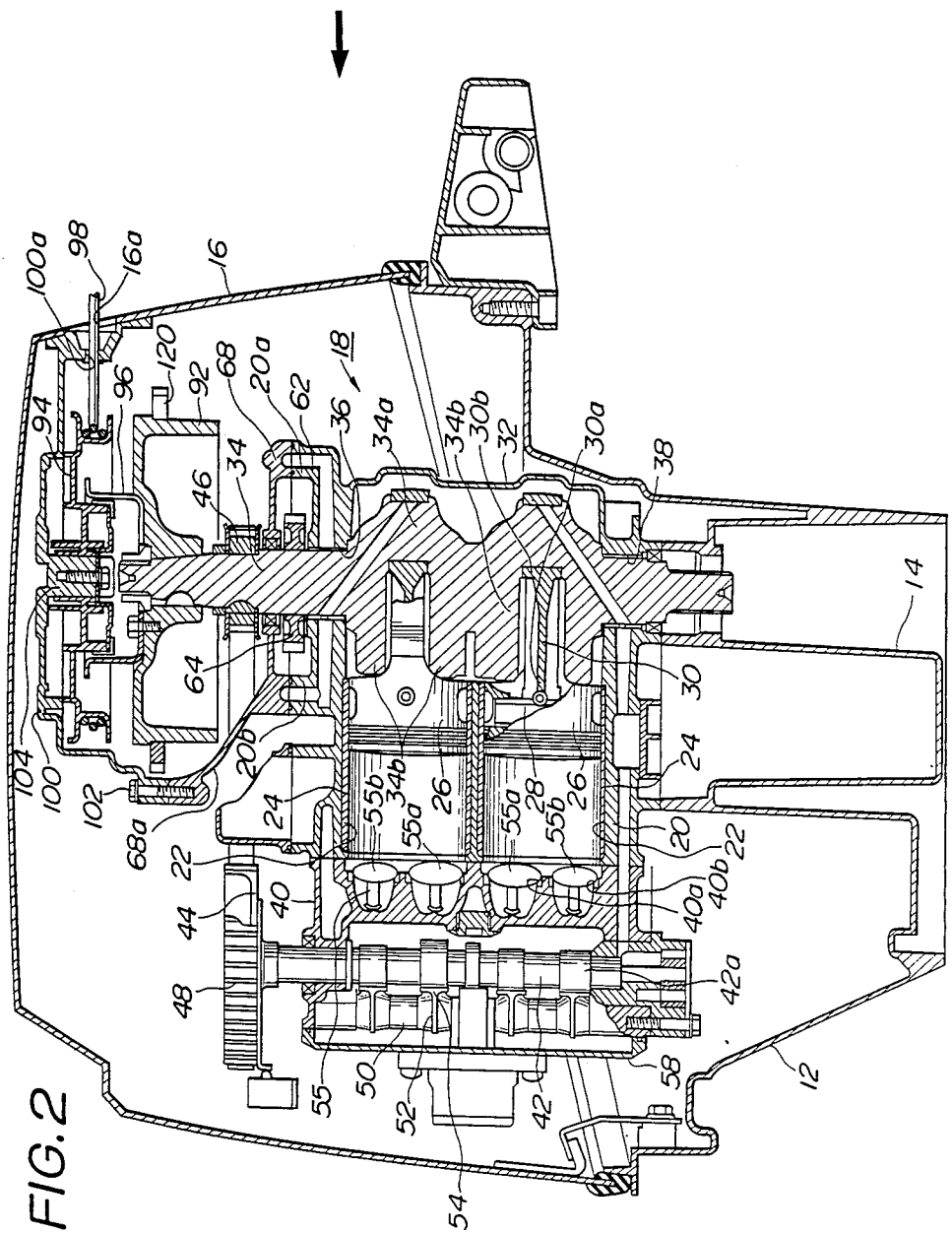
FIG. 2 is an enlarged vertical cross-sectional view of the engine indicated by the broken lines in FIG. 1.

As illustrated in FIG. 2, the engine 18 is a two-cylinder four-cycle engine supported on a support including the oil pan 14 and including a cylinder block 20 having a vertical array of two cylinders 22. A cylinder liner 24 is fitted against the inner wall surface of each of the cylinders 22. A piston 26 is slidably disposed in each of the cylinders 22 for linear reciprocating movement therein. The pistons 26 have respective piston pins or wrist pins 28 (FIG. 4) to which ends 30a (known as "small ends") of connecting rods 30 are connected. The other ends 30b (known as "big ends") of the connecting rods 30 are connected to a vertical crankshaft 34 for converting linear movement of the pistons 26 to rotary movement of the crankshaft 34.

A crankcase 32 is joined to a righthand (as shown in FIG. 2) open side of the cylinder block 20 through a suitable gasket. The crankshaft 34 is rotatably journaled by vertically spaced portions 36, 38 of the cylinder block 20 and the crankcase 32. A cylinder head 40 is joined to a lefthand (as shown in FIG. 2) open end of the cylinder block 20 through a suitable gasket. A camshaft 42 is rotatably mounted in the cylinder head 40 parallel to the crankshaft 34. The camshaft 42 has an upper end projecting from the cylinder head 40 and to which a sprocket 44 is fixed. A timing belt 48 is trained around the sprocket 44 and another sprocket 46 which is fixed to an upper end portion of the crankshaft 34 that projects from the crankcase 32. When the crankshaft 34 rotates in one direction about its own axis in response to linear movement of the pistons 26, the rotary movement of the crankshaft 34 is transmitted to the camshaft 42 through the timing belt 48 to rotate the camshaft 42 in the same direction. In the four-cycle engines, valves (described later on) are operated in intake and exhaust strokes only. Therefore, the diameter of the camshaft sprocket 44 is selected to be twice that of the crankshaft sprocket 46, so that the camshaft 42 will make half of one revolution in response to one revolution of the crankshaft 34.

A rocker arm shaft 50 is supported in the cylinder head 40 parallel to the camshaft 42 and outwardly thereof. The rocker arm shaft 50 supports a plurality of rocker arms 52 each having a respective cam follower 54 on one end thereof and associated respectively with valve stems 55. The cam followers 54 have free ends held against respective cams 42a on the camshaft 42. The valve stems 55 have intake or exhaust valves 55a, 55b on free ends thereof for opening and closing intake and exhaust ports 40a, 40b defined in the cylinder head 40 according to operating cycles of the engine 18. The rocker arm shaft 50 may be mounted on a cylinder head cover 58 closing the cylinder head 40, as is conventional.

The crankshaft 34 includes crankpins 34a on which the big ends 30b of the connecting rods 30 are mounted by suitable bearings (not shown), and crank webs or counterweights 34b attached to axially opposite sides of the crankpins 34a. The counterweights 34b serve to correct the primary imbalance of the pistons 36, the connecting rods 30, and the piston pins 28. When the pistons 26 start to effect linear reciprocating movement, the crankshaft 34 start to rotate about its own axis. At this time, rotational inertial forces are produced in a direction normal to the direction in which the pistons 26 move. To cancel out such rotational inertial forces, a balancer mechanism, described below, is disposed above the cylinder block 20.

Figure 3:
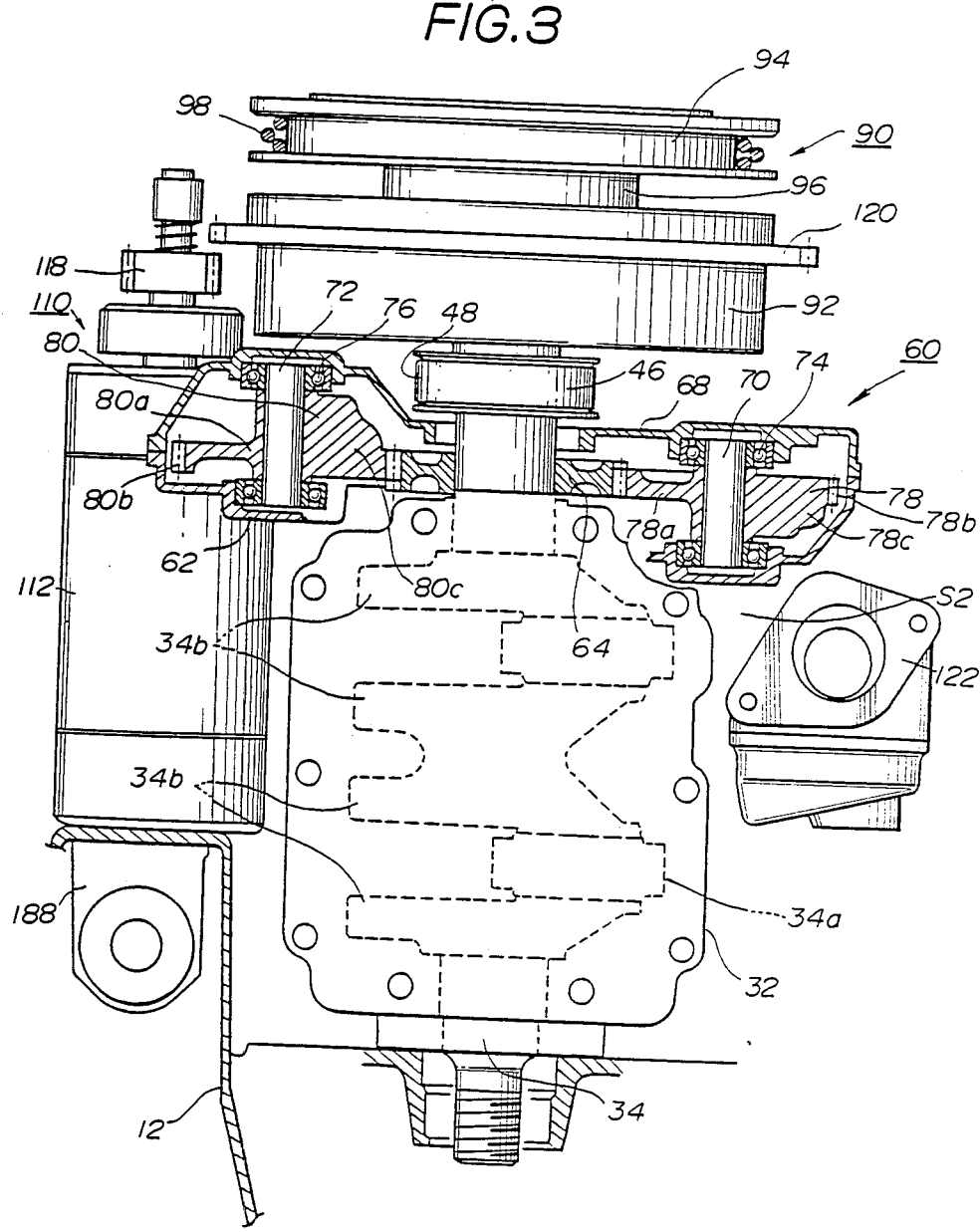
FIG. 3 is a fragmentary view as viewed in the direction of the arrow of FIG. 2, with a balancer mechanism being shown in cross section.
Figure 5:
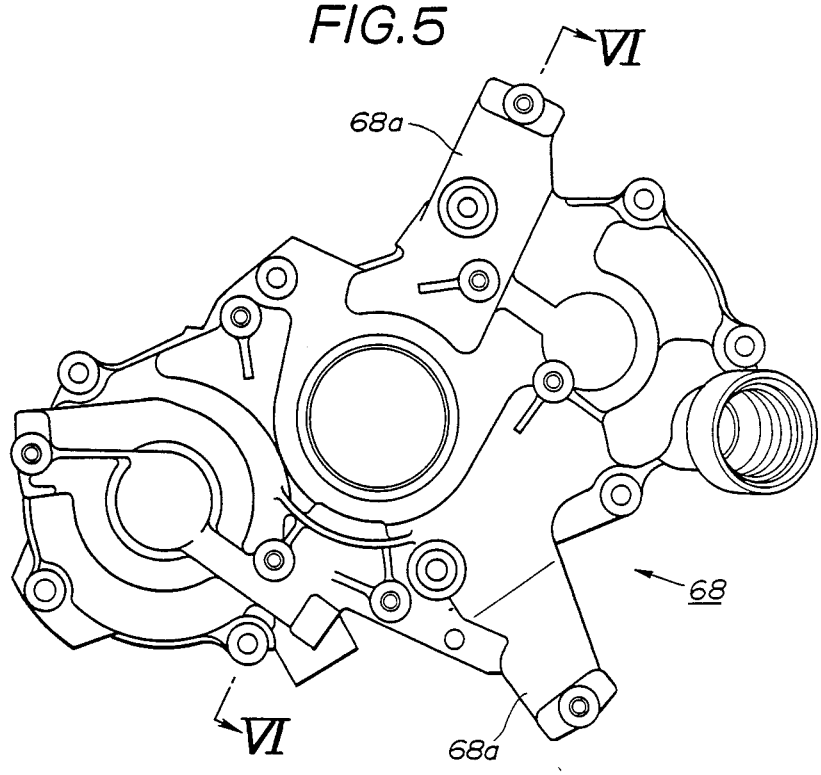
FIG. 5 is an enlarged plan view of a balancer cover shown in FIG. 2.

As best shown in FIG. 3, the balancer mechanism, denoted at 60, is housed in a balancer housing 62 disposed on the upper surfaces of and integrally formed with the walls of the cylinder block 20 and the crankcase 32. The balancer mechanism 60 includes a driver gear 64 mounted on the crankshaft 34 for corotation. The balancer housing 62 comprises a case member 20a projecting from the upper surface of a righthand (as shown in FIG. 2) end of the cylinder block 20, another case member 20b projecting from the upper surface of the crankcase 32, and a balancer cover 68 (shown in detail in FIG. 5) joined to the assembled case members 20a, 20b. In the balancer housing 62, first and second balancer shafts 70, 72 are rotatably supported by bearings 74, 76, respectively, parallel to the crankshaft 34. First and second balancers 78, 80 are mounted respectively on the balancer shafts 70, 72. The first balancer 78 comprises a disc 78a having a balancer gear 78b defined on its outer peripheral surface in mesh with the driver gear 64, and a weight 78c extending downwardly from the lower surface of the disc 78a. The second balancer 80 comprises a disc 80a having a balancer gear 80b defined on its outer peripheral surface in mesh with the driver gear 64, and a weight 80c extending upwardly from the upper surface of the disc 80a. The balancer gears 78b, 80b have the same number of teeth at the same pitches as those of the driver gear 64. Therefore, the balancer shafts 70, 72 rotate at the same speed as that of the crankshaft 34, but in the opposite direction to that of the crankshaft 34. The first and second balancers 78, 80 may be integrally formed with the respective balancer shafts 70, 72.

The weight 78c of the first balancer 78 extends downwardly from the disc 78a, as described above. In order to cancel out a downward couple force produced by the crankshaft 34, the balancer mechanism 60 should be disposed as closely to the counterweights 34b of the crankshaft 34 as possible. Since the timing belt 48 is positioned near the counterweights 34b, the weight 78c would interfere with the timing belt 48 if the weight 78c projected upwardly from the disc 78a. To avoid this, the weight 78c is disposed on the lower surface of the disc 78a. The weight 80c of the second balancer 80 positioned above the crankcase 32 projects upwardly from the disc 80a. This is because the weight 80c will not present an obstacle when attaching the crankcase 32 to the cylinder block 20 or detaching the crankcase 32 from the cylinder block 20.

Figure 4:
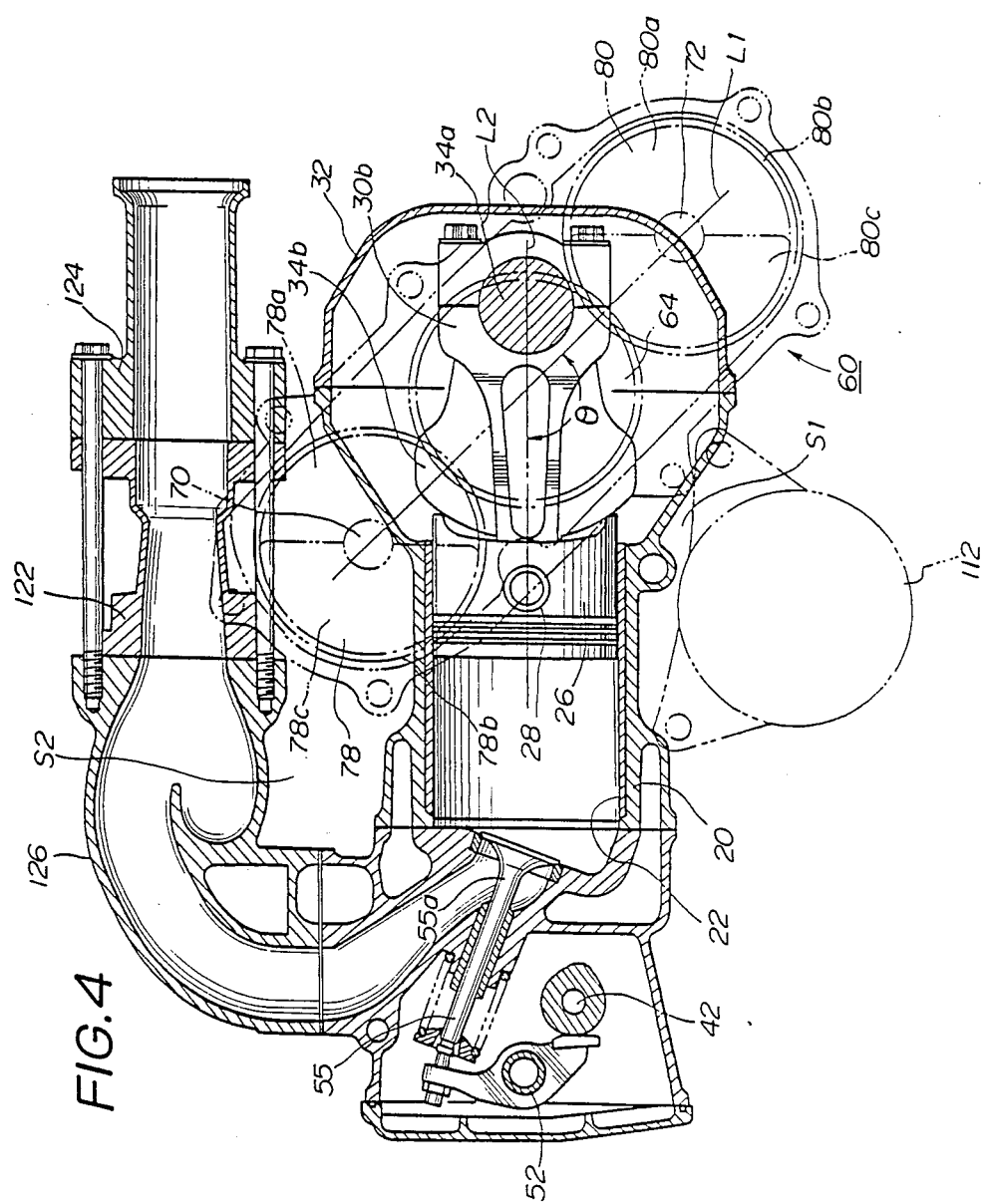
FIG. 4 is a plan view of the engine shown in FIG. 2, with an engine housing and a manually operable recoil starter mechanism being omitted from illustration for clarity.

As best illustrated in FIG. 4, the first and second balancers 78, 80 are disposed on the diametrically opposite sides of the crankshaft 34 such that a line L1 interconnecting the centers of the discs 78a, 80a of the first and second balancers 78, 80 is inclined at an angle $\theta$ to a line L2 interconnecting the piston pins 28 and the crankshaft 34. The line L1 is inclined to the line L2 so that the balancer mechanism 60 may be located more closely to the central axes of the cylinders 22. This arrangement allows the engine to have a much smaller width than would be if the angle $\theta$ between the lines L1, L2 were 90 degrees.

Operation of the balancer mechanism 60 will be described briefly. When the two pistons 26 reach the top and bottom dead centers (the piston 26 is at the bottom dead center in FIG. 4), the counterweights 34b, the weight 78c of the first balancer 78, and the weight 80c of the second balancer 80 are located on the same side, i.e., on a lefthand side as shown in FIG. 4. The four counterweights 34b are designed to bear half of inertial forces produced by the reciprocating mass of the crankshaft-connected components, and each of the weights 78c, 80c of the balancers 78, 80 is designed to bear one-quarter of the inertial forces. Therefore, the inertial forces produced by reciprocating movement of the pistons 26 are cancelled out by the counterweights 34b and the two balancer weights 78c, 80c. Other inertial forces produced in a direction normal to the direction of movement of the pistons 26, i.e., a vertical direction in FIG. 4, are also cancelled out since the counterweights 34b and the balancer weights 78c, 80c rotate in opposite directions.

Figure 6:
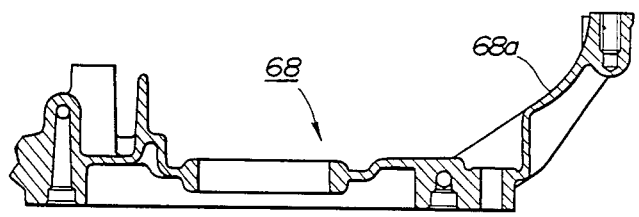
FIG. 6 is a cross-sectional view taken along line VI—VI of FIG. 5.

Referring back to FIG. 3, a manually operable recoil starter mechanism, generally indicated at 90, is mounted on the crankshaft 34 directly above the crankshaft sprocket 46. The recoil starter mechanism 90 comprises a flywheel 92 mounted on the upper end of the crankshaft 34, and a starter spool 94 axially connected to the flywheel 92 through a pulley 96. A pull rope or starter rope 98 is wound around the starter spool 94. By pulling the pull rope 98 out from the starter spool 94, the spool 94 is rotated to start the engine. The recoil starter mechanism 90 is surrounded for the most part by a cover 100 (FIG. 2) having one side fastened by bolts 102 to the distal ends of projections 68a projecting obliquely upwardly and outwardly from opposite sides of the balancer cover 68 (see FIGS. 5 and 6). Therefore, the balancer cover 68 serves to support the upper ends of the first and second balancer shafts 70, 72 and also to support the recoil starter mechanism 90. A boss 104 (FIG. 2) projects downwardly from the center of the cover 100, and the starter spool 94 is rotatably supported on the boss 104. The cover 100 has a guide hole 100a defined in one side thereof and having a suitable seal member therein, and the engine housing 16 also has a similar guide hole 16a defined therein. The starter rope 98 extends through the guide holes 100a, 16a and has one end lead out of the engine housing 16.

Figure 7:
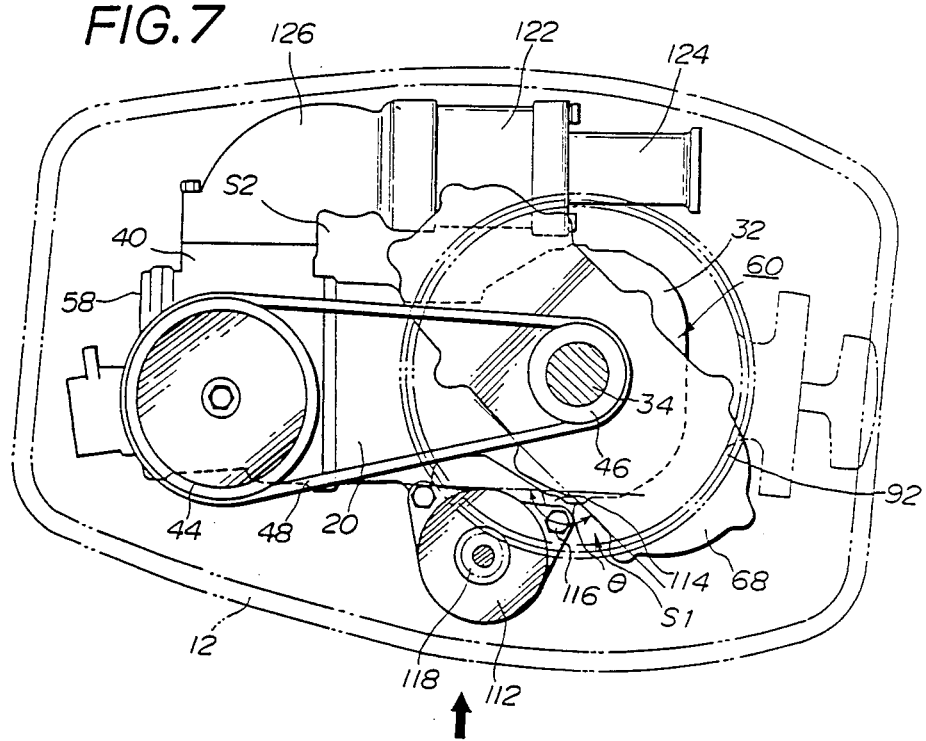
FIG. 7 is a view of a motor-operated engine starter mechanism and a carburetor which are installed on an engine block.
Figure 8:
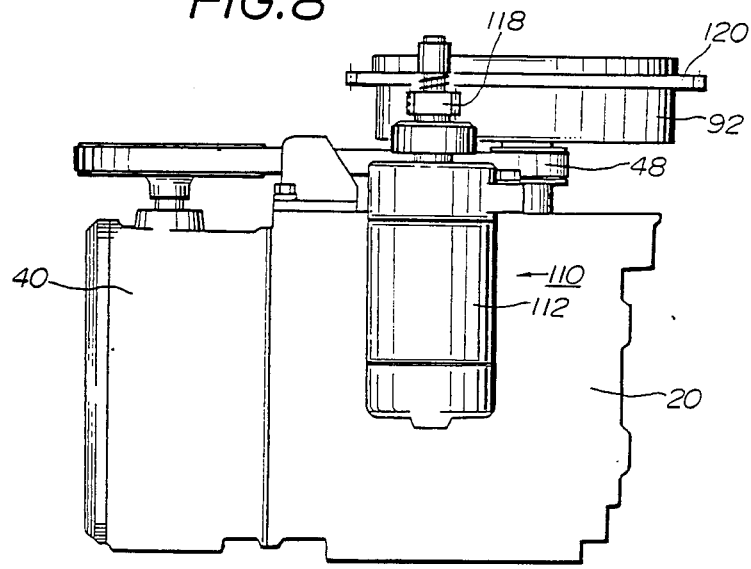
FIG. 8 is a fragmentary side elevational view of the motor-operated engine starter mechanism, as viewed in the direction of the arrow of FIG. 7.

As shown in FIGS. 7 and 8, a motor-operated engine starter mechanism 110 is mounted onto the cylinder block 20. The motor-operated engine starter mechanism 110 has a cylindrical starter 112 mounted on a bracket 114 projecting from the cylinder block 20 by means of bolts 116. The starter 112 is neatly disposed in a vertically elongate space S1 defined at an obtuse angle between a portion of the cylinder block 20 and a portion of the balancer housing 62 in which the second balancer 80 is located. This arrangement of the starter 112 makes the entire engine compact. The starter 112 has a driver gear 118 which will mesh with a ring gear 120 on the outer periphery of the flywheel 92 when starting the engine. For manually starting the engine, the driver gear 118 is positioned below the ring gear 120, as shown in FIG. 3.

A carburetor 122 is neatly positioned in a space S2 defined between a portion of the cylinder block 20 and a portion of the balancer housing 62 in which the first balancer 78 is disposed (see FIGS. 3 and 4). The carburetor 122 has an upstream end connected to one end of an air inlet pipe 124 and a downstream end coupled to one end of an intake manifold 126. The other end of the intake manifold 126 is joined to the cylinder head 40. The carburetor 122 in its entirely extends substantially parallel to the cylinders 22. With this arrangement, the intake manifold 126 is of an increased pipe length for improving the mixed condition of an air-fuel mixture produced by the carburetor 122. The air inlet pipe 124 is also of an increased length as it is disposed in the space S2 which is defined on one longitudinal side of the cylinder block 20. The long air inlet pipe 124 is effective in uniformizing and smoothing an air flow to be introduced into the carburetor 122.

Figure 9:
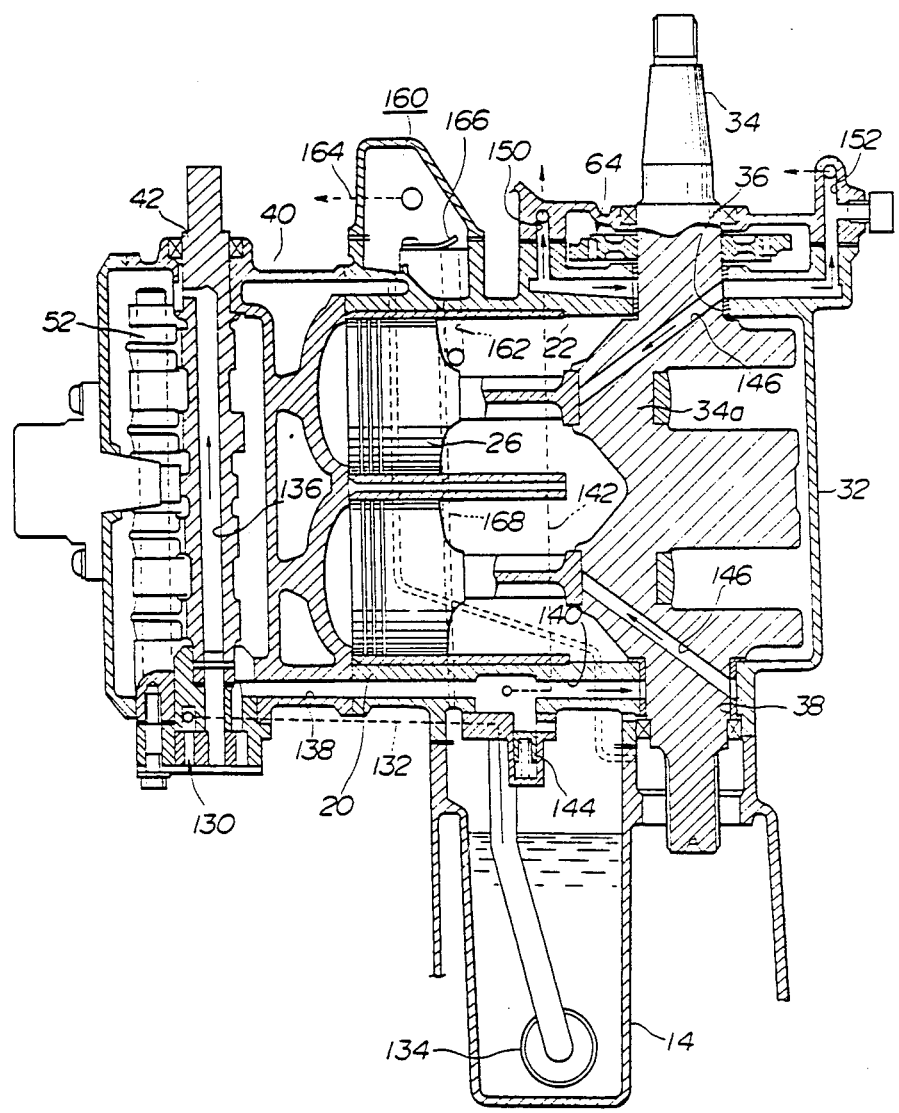
FIG. 9 is a view similar to FIG. 2, showing a lubricating system.

FIG. 9 show an engine lubricating system. An oil pump 130 is connected to the lower end of the camshaft 42 and held in communication with the oil pan 14 through an inlet passage 132. The inlet passage 132 has one end opening at the bottom of the oil pan 14 through a filter 134. When the camshaft 42 is rotated, the oil pump 130 is actuated thereby to draw lubricating oil from the oil pan 14. The oil pump 130 has an outlet port branched into a first oil passage or line 136 defined in the camshaft 42 and a second oil passage or line 138 defined in the bottom of the cylinder block 20. The second oil passage 138 is further branched into a third oil passage 140 leading to a lower portion of the crankshaft 34 and a fourth oil passage 142 leading to an upper portion of the crankshaft 34. The second oil passage 138 has a relief valve 144 for regulating the oil pressure therein to a preset level. Lubricating oil discharged from the upper end of the first oil passage 136 into the cylinder head 40 lubricates the rocker arms 52 and then returns through a return oil passage (not shown) into the oil pan 14. Lubricating oil supplied to the upper and lower portions of the crankshaft 34 through the second, third, and fourth oil passages 138, 140, 142 flows through fifth oil passages 146 defined in the crankshaft 134 and extending from the crankshaft portions journaled by the cylinder block 20 and the crankcase 32 to the crankpins 34a, and then is scattered into the crankcase 32 to lubricate the crankpins 34a and the inner wall surfaces of the cylinders 22 simultaneously. Thereafter, the lubricating oil flows back to the oil pan 14.

Figure 10:
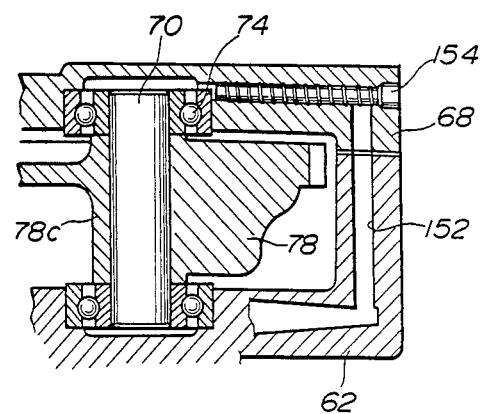
FIG. 10 is an enlarged fragmentary cross-sectional view of an oil passage for supplying lubricating oil to the bearings of balancer shafts.

The fourth oil passage 142 is branched into sixth and seventh oil passages 150, 152, through which lubricating oil is supplied to the bearings 74, 76 of the first and second balancer shafts 70, 72. Plugs 154 having helical grooves defined in their outer peripheral surfaces are threaded respectively in the oil passages 150, 152 as shown in FIG. 10 (only the plug 154 in the oil passage 152 is shown). The plugs 154 produce a suitable resistance to oil flow in the oil passages 150, 152 for limiting the amount of lubricating oil to be supplied to the first and second balancer shafts 70, 72. The helical grooves of the plugs 154 present an appropriate orifice effect without causing a clog in the oil passages.

A breather chamber 160 (FIG. 9) is defined in an upper wall of the cylinder block 20. The breather chamber 160 communicates with the interior of the crankcase 32 through a breather passage 162, and is vented to atmosphere through a breather pipe 164. The breather passage 162 has an end opening into the breather chamber 160, with a check valve 166 being disposed at the open end of the breather passage 162 for keeping the pressure in the crankcase 32 at a certain vacuum level. The check valve 166 therefore suppresses pressure pulsations in the crankcase 32 which would otherwise be brought about by reciprocating movement of the pistons 26. Upon reciprocating movement of the pistons 26, an oil mist in the crankcase 32 is fed into the breather chamber 160. Lubricating oil separated from the oil mist in the breather chamber 160 returns into the oil pan 14 through a return oil passage 168 opening at a lower bottom of the breather chamber 160.

Turning back to FIG. 1, the outboard motor is shown having a housing including an upper portion 16 enclosing the engine 18, an intermediate portion 13a, and a lower portion 13b. Housing portion 13a is joined to the lower end of the oil casing 12, and housing portion 13b is joined to the lower end of housing portion 13a. A drive shaft 170 (indicated by the broken lines) is disposed in the housings 13a, 13b, and has one end connected to the lower end of the crankshaft 34 through a suitable coupling. The other or lower end of the drive shaft 170 is operatively coupled to one end of a propeller shaft 174 through a plurality of meshing gears 172. A propelling means or propeller 176 is fixed to the other or outer end of the propeller shaft 172.

A boat (not shown) on which the outboard motor 10 is mounted can be steered by turning a steering lever 180 attached to an end of an engine mount 184 to angularly move the outboard motor 10 about a shaft 182.

Figure 11:
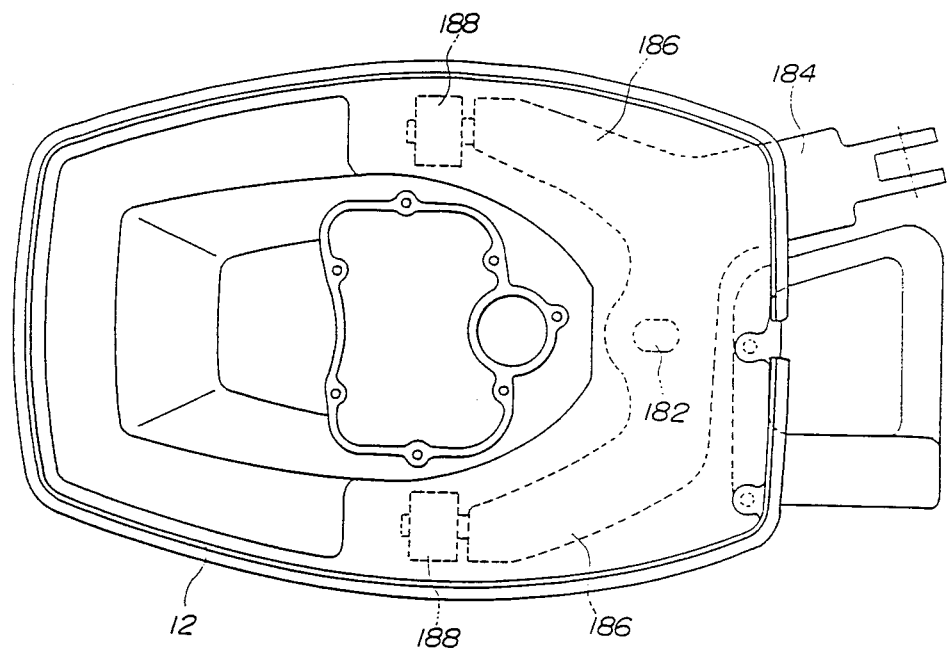
FIG. 11 is a view of an oil case supported on an engine mount.
Figure 12:
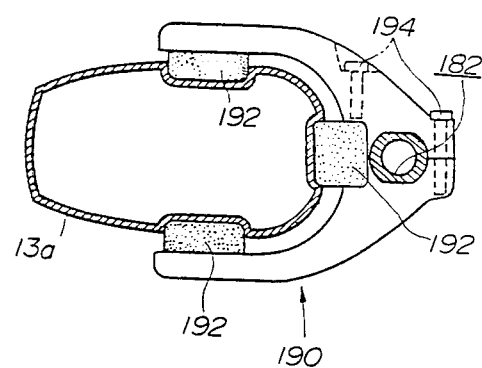
FIG. 12 is a plan view of a clamp attached to an upper drive shaft housing shown in FIG. 1.

As shown in FIG. 11, the engine mount 184, substantially Y-shaped, has a central portion disposed forwardly of the oil casing 2 near the stern of the boat. The engine mount 184 has divided arms 186 with respective rubber mounts 188 disposed on distal ends thereof and supporting the lower surfaces of laterally opposite flanges of the oil casing 12. The upper end of the shaft 182 is fixed to the lower surface of the engine mount 184. A clamp 190 is attached to the upper drive shaft housing 13a near a shoulder 13c thereof through rubber pads 192, as shown in FIG. 12. More specifically, the clamp 190 comprises a pair of lateral elements or arms which are fastened around the lower end of the shaft 182 by means of two adjustment screws 194.

On the shaft 182 between the engine mount 184 and the clamp 190, there is rotatably mounted a swivel bracket 196 that is swingable with respect to a stern bracket 198 about a tilting shaft 200. The stern bracket 198 has a manually operable adjustment screw 202 to clamp the outboard motor or motor assembly 10 on the stern of the boat.

In the illustrated embodiment, inertial forces of the balancer mechanism 60 act on the upper portion of the crankshaft 34, whereas inertial forces of the crank webs 34a act on the substantially intermediate portion of the crankshaft 34. Therefore, a couple of forces is applied to the crankshaft 34 about a certain axial pint thereon. Vibration of the outboard motor 10 due to such a couple of forces is however absorbed by the rubber mounts 188 of the engine mount 184 and the rubber pads 192 of the clamp 190.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:
1. An engine comprising:
    an engine block includes a cylinder block and a crankcase joined to an open side of said cylinder block, said engine block having at least one cylinder therein;
    a piston reciprocally movable in said cylinder;
    a crankshaft vertically extending through an rotatably supported in said engine block, said crankshaft having a counterweight;
    a connecting rod operatively interconnecting said piston and said crankshaft;
    a balancer housing projecting from upper surfaces of said cylinder block and said crankcase, said balancer housing having an upper opening closed by a cover; and
    a balancer mechanism coacting with said crankshaft and disposed upwardly of said engine block in said balancer housing, said balancer mechanism includes a driver gear mounted on said crankshaft, first and second balancer shafts having upper ends rotatably supported in said cover and lower ends rotatably supported in said balancer housing, and extending parallel to said crankshaft, and first and second balancers mounted respectively on said first and second balancer shafts and operatively coupled to said driver gear

2. An engine according to claim 1, wherein said first and second balancers each comprise a disc having a gear on its outer periphery meshing with said driver gear and carrying a weight, said first and second balancer shafts each being rotatably at the same speed as said crankshaft in a direction opposite thereto.

3. An engine according to claim 1, further including a manually operable recoil starter mounted on said crankshaft above said balancer mechanism and supported on said cover.

4. An engine according to claim 1, further including:
    first and second bearings for rotatably supporting said first and second balancer shafts, respectively, in said cover and said balancer housing; and
    pump means connected to a first oil passage leading to an upper portion of said crankshaft and a second oil passage leading to a lower portion of said crankshaft, said first oil passage being branched into a third oil passage for supplying lubricating oil therethrough to said first bearing and a fourth oil passage for supplying lubricating oil therethrough to said second bearing.

5. An engine according to claim 4, further including plugs having helical grooves and inserted respectively in said third and fourth oil passages.

6. An engine according to claim 2, wherein said first and second balancers are disposed on diametrically opposite sides of said driver gear and arranged such that a line interconnecting the centers of the discs of said first and second balancers is angled with respect to a line interconnecting the axis of said crankshaft and a point where said connecting rod is coupled to said piston.

7. An engine according to claim 6, further including a flywheel mounted on an upper end of said crankshaft above said balancer mechanism, and an engine starter device mounted on said cylinder block and positioned in a first space defined by a portion of said 8. An engine according to claim 6, further including a carburetor connected to a cylinder head through an intake manifold, said cylinder head being joined to one side of said cylinder block remote from the open side thereof to which said crankcase is joined, said carburetor being disposed in a second space defined by a portion of said balancer housing which accommodates said first balancer and a portion of said cylinder block.

9. An engine according to claim 2, wherein said weight of the first balancer extends downwardly from a lower surface of said disc thereof.

10. An engine according to claim 2, wherein said weight of the second balancer extends upwardly from an upper surface of said disc thereof.

11. An outboard motor comprising:
a housing;
an engine block disposed in said housing;
said engine block includes a cylinder block and a crankcase joined to an open side of said cylinder block, said engine block having at least one cylinder therein;
a piston reciprocally movable in said cylinder;
a crankshaft vertically extending through and rotatably supported in said engine block, said crankshaft having a counterweight;
a connecting rod operatively interconnecting said piston and said crankshaft;
a balancer housing projecting from upper surfaces of said cylinder block and said crankcase, said balancer housing having an upper opening closed by a cover;
a balancer mechanism coacting with said crankshaft and disposed upwardly of said engine block in said balancer housing, said balancer mechanism comprising a driver gear mounted on said crankshaft, first and second balancer shafts having upper ends rotatably supported in said cover and lower ends rotatably supported in said balancer housing, and extending parallel to said crankshaft, and first and second balancers mounted respectively on said first and second balancer shafts and operatively coupled to said drive gear;
propelling means operatively coupled to a lower end of said crankshaft; and
support means for supporting the outboard motor on a boat.

12. An engine according to claim 11, wherein said support means comprises an engine mount supporting an upper portion of said housing, and a clamp supporting an intermediate portion of said housing, said engine mount including divided arms having rubber mounts on respective distal ends thereof, said clamp having rubber pads by which said intermediate portion of the housing is supported.

13. An engine comprising:
an engine block having at least one cylinder therewithin;
a piston reciprocally movable within said cylinder;
a crankshaft rotatably supported in said engine block and extending vertically therethrough, said crankshaft having a counterweight;
a connecting rod operatively interconnecting said piston and said crankshaft;
a recoil starter mechanism including a flywheel mounted to the upper end of the crankshaft; and
a balancer mechanism housed in a balancer housing and located between said flywheel and said engine block, said balancer mechanism including a drive gear mounted on said crankshaft, first and second balancer shafts rotatably supported within said balancer housing and extending parallel to said crankshaft, and first and second balancers mounted on said first and second balancer shafts, respectively and both operatively coupled to said drive gear.

14. An outboard engine comprising:
a housing;
an engine block disposed in said housing and having at least one cylinder therewithin;
a piston reciprocally movable within said cylinder;
a crankshaft rotatably supported in said engine block and extending vertically therethrough, said crankshaft having a counterweight;
a connecting rod operatively interconnecting said piston and said crankshaft;
a recoil starter mechanism including a flywheel mounted to the upper end to the crankshaft;
a balancer housing located between said engine block and said flywheel;
a balancer mechanism housed in said balancer housing; and
propelling means operatively coupled to the lower end of said crankshaft;
said balancer mechanism including a drive gear mounted on said crankshaft, first and second balancer shafts rotatably supported within said balancer housing and extending parallel to said crankshaft, and first and second balancers mounted on said first and second balancer shafts, respectively, and both operatively coupled to said drive gear.

15. An engine comprising:
an engine block having axially spaced endwalls each provided with a crankshaft bearing, said engine block includes (1) a cylinder block having an open side extending between said endwalls of said engine block and (2) a crankcase joined to said open side of said cylinder block, said engine block having at least one cylinder therein;
a piston reciprocally movable in said cylinder;
a crankshaft extending axially through said engine block, said crankshaft having ends thereof rotatably supported in said crankshaft bearings and having a counterweight;
a connecting rod operatively interconnecting said piston and said crankshaft;
a balancer housing projecting axially outwardly from one endwall of said engine block, said balancer housing having an axially outwardly facing opening closed by a cover; and
a balancer mechanism coacting with said crankshaft and disposed axially outwardly of said engine block in said balancer housing, said balancer mechanism includes (1) a driver gear mounted on said crankshaft, (2) first and second balancer shafts extending parallel to said crankshaft and having outer ends rotatably supported in said cover and inner ends rotatably supported in said balancer housing and (3) first and second balancers mounted respectively on said first and second balancer shafts and operatively coupled to said drive gear.

16. An engine according to claim 15, wherein said endwalls of said engine block are constituted by mated ends of said cylinder block and said crankcase, and said balancer housing is constituted by mated integral extensions of said mated ends.

* * * * *